Aug. 11, 1964   I. GINSBURGH   3,144,049
METHOD FOR SEALING LEAKS AND LEAK SEALANT
Filed June 28, 1962
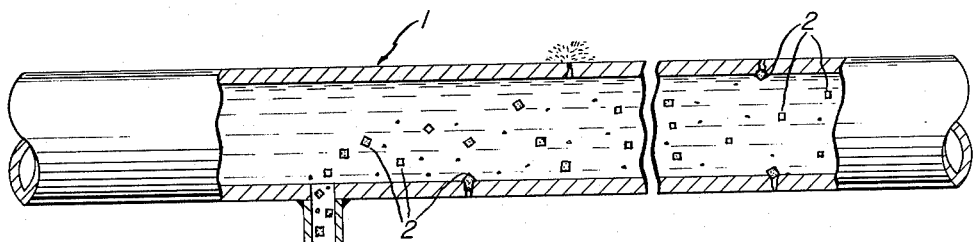
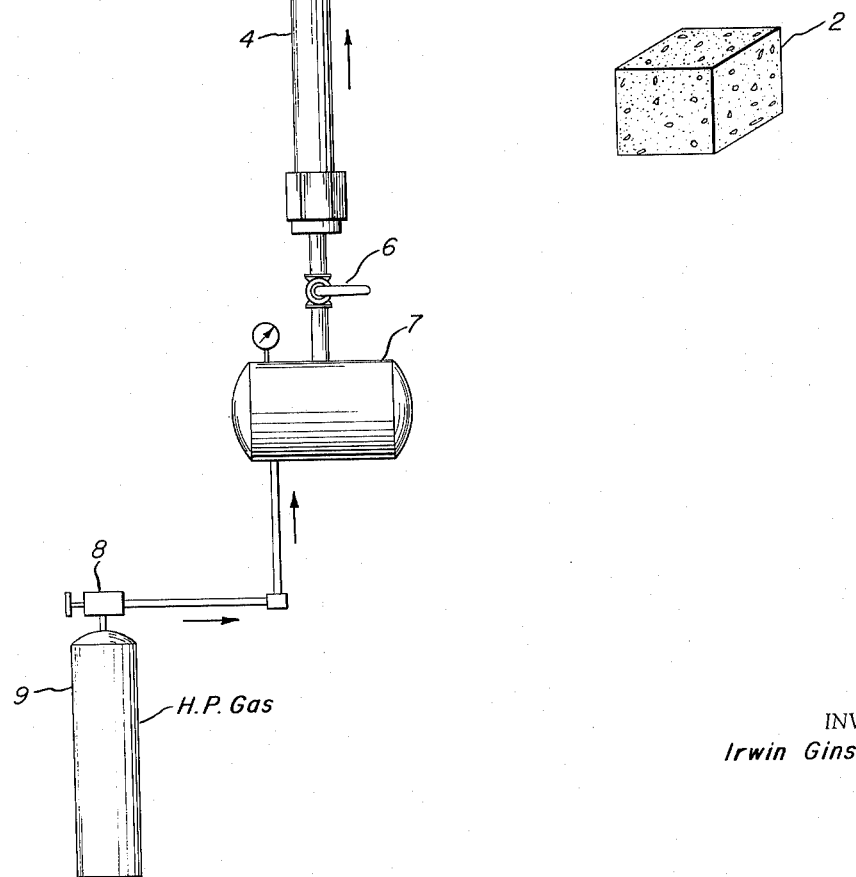
INVENTOR.
Irwin Ginsburgh

United States Patent Office 3,144,049
Patented Aug. 11, 1964

3,144,049
METHOD FOR SEALING LEAKS AND LEAK SEALANT
Irwin Ginsburgh, Morton Grove, Ill., assignor to Standard Oil Company, Chicago, Ill., a corporation of Indiana
Filed June 28, 1962, Ser. No. 206,042
4 Claims. (Cl. 138—97)

This invention relates to a method for sealing leaks in fluid carrying conduits, and to the plugs used to effect the seal. The invention also concerns a method for sealing leaks in fluid carrying conduits, while the conduit is transporting fluid, by introducing to the conduit, upstream of the suspected leak, plugs having a density substantially equal to that of the fluid flowing in the conduit. More particularly, the invention relates to novel leak plugs for use with a fluid carrying conduit which have a density substantially equal to that of the fluid in the conduit, and to apparatus for introducing the plugs to a fluid carrying conduit.

Losses resulting from undetected leaks in industrial operations such as hydrocarbon refining, chemical processing, water treating, and pipeline transportation and storage operations are of substantial economic importance. The Oil and Gas Journal, March 3, 1939, page 104, indicated the magnitude of utility leaks. A few illustrations from the data presented in the Journal will demonstrate the significance of leaks. A 2 drop per second leak in an oil line will lose 30 barrels of oil per year. A three-eighth inch opening in an oil line will lose approximately 3,708 barrels of oil per year. A one-half inch opening in a fuel gas line under 20 p.s.i. will lose 5,420,000 cubic feet per month. Steam under 140 p.s.i. will escape through a one-eighth opening at the rate of 68,000 pounds per month.

Leaks are often difficult to detect, particularly if a conduit is buried or insulated. By the time hidden leaks are detected by inventory losses, or become visually detectable, many barrels of valuable product may be lost. Even after detection, the cost of locating the leak and digging up a buried conduit to replace or repair a section of the conduit to eliminate leaks, is extremely high. Additional economic losses are incurred when the conduit must be blocked off and operations ceased while leaks are being repaired. Therefore, it is desirable to seal leaks in fluid carrying conduits without uncovering buried conduits to find and repair the leak, and without ceasing flow through the conduit. In addition to the economic losses resulting from small leaks, they create a hazard in industries where volatile, explosive, or corrosive fluids are employed. Small undetected leaks may saturate the media surrounding the conduit, causing an acute fire hazard. Similarly, corrosive or deleterious liquids may seep from small leaks in the conduit and result in injury to personnel and destruction of equipment.

It is an object of the present invention to provide a method for sealing leaks in fluid carrying conduits. It is also an object of this invention to provide a method for plugging leaks while the conduit continues to transport fluid. Another object of the invention is to provide novel leak sealing plugs. A further object is to provide a method for internally sealing leaks in fluid carrying conduits by introducing into the conduit plugs having a density substantially equal to that of the fluid flowing in the conduit. Additional objects will become obvious to those skilled in the art upon reading the specification.

Broadly, in accordance with the invention, there is provided a method for sealing leaks in fluid carrying conduits which comprises introducing to the conduit, upstream of the suspected leak, solid plugs having a density substantially equal to that of the fluid flowing in the conduit, said plugs being carried by the flow of fluid to the area of the leak where they become lodged in the openings causing the leak. There is also provided for use in combination with a fluid carrying conduit a novel leak sealant which comprises cellular plugs having a density substantially equal to that of the liquid flowing in the conduit.

More specifically, the present invention provides a novel leak sealant for use in combination with the fluid carrying conduit. The leak sealant comprises closed cellular, compressible elastomer plugs which have been pretreated to adjust their density to be substantially equal to that of the fluid flowing in the conduit. There is also provided an apparatus for injecting the plugs into a fluid carrying conduit while the conduit is on-stream. The injection apparatus comprises, in combination with a fluid carrying conduit, a valve means opening into said conduit and holding means attachable to said valve means for holding said plugs. A second valve means for controlling a pressurized fluid source is arranged in the holding means behind the plugs and the second valve means may be actuated to release the pressurized fluid.

The plugs employed in the present invention may be any shape such as spheres, disks, or rods. However, cubular plugs have been advantageously used. The size of the plug will vary depending largely upon the size of the leak in the conduit which is to be treated with the plugs. Typically, small plugs having a major dimension of about one-sixteenth to about one-eighth inch to large plugs having a major dimension of one-half inch or more are employed. It is desirable to use a small amount of very small crumbs to seal seepage and possible leaks around joints and through pipe threads.

The material from which large plugs are made should be a firm somewhat rigid material. Otherwise, the plug will be easily extruded through the large openings by the pressure within the conduit. Smaller plugs may be of softer material since they are not easily extruded through small openings. When treating a conduit to a plug a leak of unknown size, it is desirable to use random sized plugs. The flow through leaks in the conduit selectively diverts plugs to the opening causing the leakage. A small leak does not cause sufficient flow to effectively divert very large plugs to the opening, even though their density is substantially equal to that of the liquid in the conduit. The proper size plug and smaller plugs are both diverted; the smaller extruded through, and the correct size is lodged in the leak opening. Therefore, if the size of the leak is unknown, random sized plugs should be employed to increase the probability that a plug will be pulled into openings of any possible size.

Advantageously, plugs are constructed of closed cellular elastomers such as rubber, buna rubber, chloroprene, and the like. A preferred material, particularly for use in hydrocarbon-carrying conduits, is neoprene. Neoprene swells after exposure to hydrocarbons for several hours. Once a neoprene plug is lodged in a leak opening in a hydrocarbon line, it will swell to more tightly seal the leak. Plugs may be constructed of special materials to withstand particular conditions within the conduit. For example, if the conduit carries a high temperature fluid, plugs constructed of silicone heat-resistant rubber may be used. In the case of a conduit carrying an acid, the plugs may be constructed of a nitrile rubber to resist the corrosive affect of the acid.

The bulk density of the plugging material is of particular importance to the present invention. Previous internal plugging procedures, employing solidifiable liquids or solids having no particular density requirements, were not entirely satisfactory. The leak plugging materials tended to sink to the bottom of the conduit, and slippage between the plugging material and the fluid often occurred. Since the plugging material did not have specific density requirements, the plugs were not highly mobile within the fluid. The relatively slight pull exerted on the plugs by the flow through the leak was ineffective to divert the plugs out of the main flow of fluid and into the opening causing the leak. By approximating and preferably equating the bulk density of the plug material to that of the fluid in the conduit, a radically more effective leak plugging procedure is obtained. Random distribution of the plugs throughout the cross sectional area of the conduit is obtained, and little slippage between the plugs and fluid occurs. More importantly, the plugs are easily pulled from the main flow of the conduit to the leak by the side flow created by the opening. Using the novel leak plugs of the present invention, a high precentage of leaks will be sealed. It has been found that with one treatment about 75% of the leaks in a section of 6 inch conduit will be sealed when about one-half cup of random sized cubes having a density substantially equal to that of the fluid in the conduit are introduced.

Plugs having a bulk density substantially equal to that of a fluid flowing in a conduit may be prepared by impregnating a sponge like closed or open cellular material with a fluid. Air pockets within the porous cellular structure are filled with the liquid and the bulk density of the material will be very nearly equal to the density of fluid employed. The plugs may be pretreated to obtain the desired density by soaking, exposure to a high flow aspirator, or treatment with the liquid under vacuum. The difficulty with which plugs are impregnated with liquids depends primarily on the material from which the plugs are constructed. A firm material having a small cellular structure is difficult to impregnate, and may require soaking at elevated pressures for several hours. Softer sponge materials are easily impregnated with the liquid by vacuum treating for a short time, or by boiling in those liquids that can be readily boiled.

It is preferred that a sponge material having a closed cellular structure be impregnated with the fluid to obtain plugs having the desired density, rather than using a dense material. If the impregnating fluid is carefully selected, advantage may be gained from the swelling of the sponge material. A sponge material impregnated with liquid will deform under the pressure in the conduit to effectively seal the opening causing the leak, whereas denser, heavier plugs may not. Any fluid may be used to impregnate the cellular sponge material. It has been found desirable to use the liquid flowing in the conduit to be treated. However, other fluids compatible with the plug material and the fluid flowing in the conduit may be introduced into the plug material.

It may be desirable to impregnate the plugs with a fluid capable of solidifying. The fluid should be selected carefully to obtain a density balance between the fluid flowing in the conduit and the bulk density of the plugs. Further, the solidifiable fluid must be compatible with the plug material and insoluble in the fluid within the conduit. Examples of solidifiable materials which may be suitably employed are synthetic and natural resins, glues, and the like. By impregnating the plugs with a material which will solidify after the plugs become lodged in the leak opening, a permanent seal is obtained.

The plugs are introduced to the liquid carrying conduit upstream of the area of the suspected leak. It has been found that the plugs will remain dispersed within the liquid and travel downstream for at least several thousand feet. Therefore, the injection point may be some distance upstream at a gate valve or other suitable access point to the conduit. An advantageous procedure for introducing the plugs to a pressurized conduit utilizes an upstream gate valve. The plugs are placed in a holding pipe, and the pipe is then filled with liquid. The holding pipe is attached to the gate valve. A means for exerting pressure within the holding pipe is provided at the pendant end of the pipe. A tank of gas such as nitrogen and a quick opening valve are advantageously employed to produce a burst of pressure within the holding pipe. After attaching the holding pipe to the gate valve, the gate valve is opened while the quick opening valve controlling the nitrogen pressure remains closed. The quick opening valve is then opened permitting a burst of gas pressure to drive the liquid containing the plugs from the holding pipe, through the gate valve and into the conduit.

It has been found that large plugs are difficult to inject into the conduit. Several large plugs will enter the gate valve, or other constrictions, simultaneously and become wedged. To avoid wedging large plugs, a tube having a diameter equal to or just larger than that of the plugs is used. The plugs are stacked in succession within the tube and the tube is positioned at the opening of the gate valve. When fluid pressure is exerted at the rear end of the tube, the plugs will be ejected in sequence and will pass through constrictions without becoming wedged.

The flow rate of the liquid within the conduit has been found to be related to the effectiveness of the present invention. In experiments using neoprene plugs, it was found that flow rates below about 1 foot per second tended to cause the plugs to settle out of the liquid, rather than maintain a random distribution within the liquid. This is undesirable because it inhibits the plugs from becoming lodged in leak opening in the upper portion of the conduit. If the flow rate is excessive, upwards of 50 feet per second, the velocity of the liquid tends to drive the plugs past small openings in the conduit and prevents the plugs from effectively being pulled to the opening causing the leak. Optimum flow rates for maximum effectiveness of the leak plugging procedure of the present invention have been found to be about 2.0 to about 20 feet per second. Pressures within the conduit may vary from about 5 p.s.i. to at least about 1,000 p.s.i. without substantially affecting the invention. However, it is preferred that a conduit pressure of at least 20 p.s.i. be maintained during the leak plugging procedure.

The leak plugging technique is not materially affected by the viscosity of the liquid flowing in the conduit. Experiments have shown the procedure to operate effectively in liquids ranging from water to heavy oils.

The quantity of plugs employed in the leak plugging method of the present invention varies with the diameter of the conduit. For a conduit of 6 inches in diameter, it has been found desirable to use about one-half cup of random sized and shaped plugs. An increase in the quantity of plugs employed in treating a conduit of a given size will increase the probability that a plug will be drawn to an opening in a conduit which causes the leak. It is believed that the quantity of plugs employed should increase directly with the cross sectional area of the conduit under treatment.

Only a relatively small quantity of plugs are required to effectively close a high percentage of the leaks in a conduit. This small amount of plugs will generally be insufficient to create serious contamination problems. However, should it be necessary to remove the plugs from a stream, removal may be accomplished by inserting a strainer or filter at a point downstream from the injection.

FIG. 1 illustrates apparatus for injecting the plugs into a fluid carrying conduit.

FIG. 2 illustrates a novel leak plug.

With reference to FIG. 1, the conduit 1 is treated with the novel peak plugs of this invention while on stream by introducing the plugs 2 through a gate valve 3. The plugs 2 are placed in a holding pipe 4, and the pipe is filled with the fluid flowing in the conduit or a fluid compatible with that of the conduit. The holding pipe 4 is attached to the gate valve 3 while the valve is closed. A quick opening valve 6 is positioned beyond the holding pipe 4. Tank 7 is pressurized while the quick opening valve 6 is closed. The high pressure gas supply from the tank 9 is then closed off by the valve 8. It has been found advantageous to use the intermediate tank 7 to prevent excessive quantities of high pressured gas from entering the conduit 1. A $CO_2$ cartridge may be used, rather than the tank. After the pressure in tank 7 is raised to exceed the pressure in conduit 1, and the gate valve 3 is opened, the quick opening valve 6 is opened to permit the gas in tank 7 to drive the plugs 2 into the conduit 1. The density balanced plugs 2 are carried downstream by the flow of the liquid in the conduit 1 and become lodged in the leaks.

FIG. 2 illustrates a novel leak plug of the present invention. The plug 2 is for use with a fluid carrying conduit, and is particularly characterized in having a density substantially equal to that of the fluid flowing in the conduit. The plug is preferably a solid, compressible elastomer having a closed cellular structure for retaining impregnated fluids. As illustrated, the plug is preferably cubic.

Having described my invention, I claim:

1. The method of sealing leaks in liquid carrying conduits which comprises: introducing to the said liquid carrying conduit upstream of said leak porous, deformable elastomer plugs having a bulk density substantially equal to the density of the liquid in said conduit, said plugs being carried downstream in said liquid to the area of said leak where at least one of said plugs is drawn into the opening in the conduit causing the leak by the side flow resulting from the leak whereby said plug becomes lodged in said opening sealing said leak.

2. The method of sealing leaks in liquid hydrocarbon carrying conduits which comprises: introducing to said hydrocarbon carrying conduit porous deformable neoprene plugs having a bulk density substantially equal to the density of the hydrocarbon liquid flowing in the conduit, said plugs being carried downstream to the area of a leak opening where said plugs are drawn into the openings causing the leaks and become lodged in said openings sealing said leaks.

3. The method of sealing leaks in liquid carrying conduits with porous, deformable neoprene plugs which method comprises: impregnating said plugs with a liquid to impart to said plugs a bulk density substantially equal to the density of the liquid flowing in the conduit; introducing said plugs to said conduit upstream of said leak so that said plugs will be randomly distributed in and carried downstream by the flow of the liquid and there become lodged in the opening causing the leak.

4. An improved leak sealant for use in combination with a liquid carrying conduit which comprises: porous, deformable elastomer plugs impregnated with a liquid to make the bulk density of said plugs substantially equal to the density of the liquid flowing in said conduit.

References Cited in the file of this patent

UNITED STATES PATENTS

| | | |
|---|---|---|
| 1,169,250 | Fulton | Jan. 25, 1916 |
| 2,216,183 | Connell | Oct. 1, 1940 |
| 2,699,212 | Dismukes | Jan. 11, 1955 |
| 2,754,910 | Derrick et al. | July 17, 1956 |
| 2,828,769 | Cooper | Apr. 1, 1958 |
| 3,010,514 | Fox | Nov. 28, 1961 |
| 3,011,548 | Holt | Dec. 5, 1961 |